INVENTORS
S. MOON
M. R. OLSOFSKI
J. M. BAHL
A. G. WASCHEK

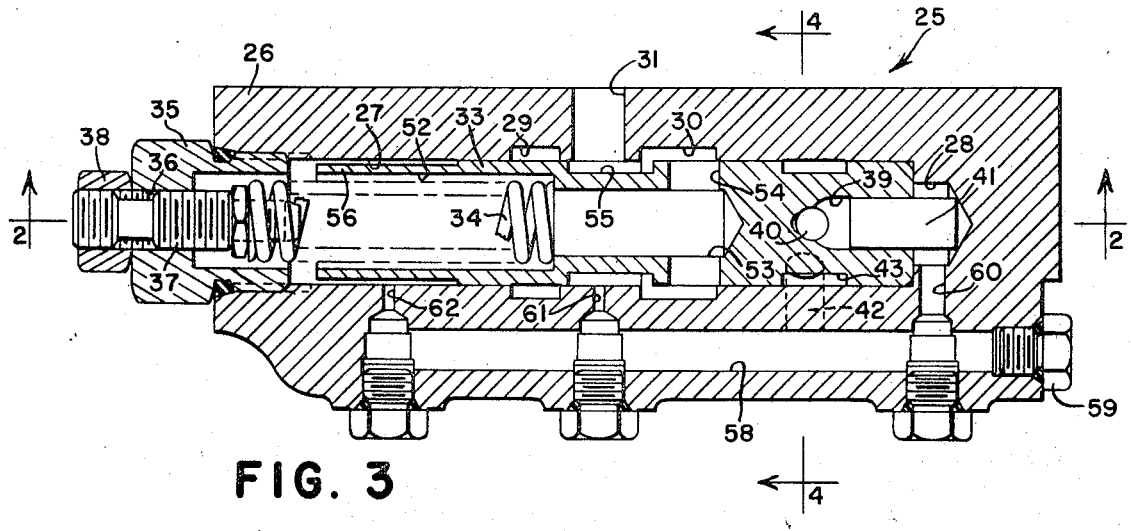

United States Patent Office 3,526,468
Patented Sept. 1, 1970

3,526,468
MULTIPLE PUMP POWER ON DEMAND
HYDRAULIC SYSTEM
Seaton Moon, Cedar Falls, and Matthew Rudolph Olsofski and James Melvin Bahl, Waterloo, and Arvid Gayle Waschek, Cedar Falls, Iowa, assignors to Deere & Company, Moline, Ill., a corporation of Delaware
Filed Nov. 13, 1968, Ser. No. 775,287
Int. Cl. F04b 49/00
U.S. Cl. 417—214                                    10 Claims

ABSTRACT OF THE DISCLOSURE

A hydraulic system having a first variable displacement pump and a second pump supplying fluid to a hydraulic function at substantially constant and variable pressures, respectively, and a pump control valve for the second pump which is responsive to the fluid pressure supplied to the function and to the discharge pressure of the second pump to stop the flow of fluid from the second pump whenever the pressure supplied to the function reaches a first predetermined value no greater than the maximum pressure which the constant pressure pump can supply until the fluid pressure supplied to the function drops below a second predetermined value below the first value and to allow full flow of fluid from the second pump when the fluid pressure supplied to the function reaches the second value until the fluid pressure supplied to the function again reaches the first value.

BACKGROUND OF THE INVENTION

The present invention relates generally to a power on demand hydraulic system and more particularly a system that has a substantially constant pressure variable displacement pump and at least one variable pressure pump.

The recent trend in hydraulic systems has been toward the use of bigger and more hydraulic motors and cylinders or hydraulic functions which are connected in parallel to the discharge side of a fluid pump of limited capacity. Many times the power demands of a single function or a combination of functions exceed the power output or capacity of a single pump and it therefore becomes necessary to use a larger pump or to provide additional pumps. Due to space limitations in some applications of hydraulic systems, for example, when used on agricultural or industrial vehicles, it is often desirable to use a multiple pump system so that the smaller pumps can be positioned at various locations on the vehicle where adequate space is available.

Various multiple pump hydraulic systems have heretofore been proposed, but each has had its shortcomings. For example, systems using a plurality of constant pressure variable displacement pumps are extremely unstable due to the hunting effect of the pumps when the demands of the system functions were less than the combined capacity of the pumps. In systems using a plurality of variable pressure or fixed displacement pumps the power losses are extremely high during periods when the demands of the system functions are equal to or less than the capacity of a single pump.

The present invention is intended to provide a multiple pump hydraulic system which includes both substantially constant and variable pressure pumps and which does not exhibit any of the above noted shortcomings of prior multiple pump systems. By way of explanation, the expression "constant pressure pump" is intended to describe those pumps which operate at a substantially constant pressure and whose volume output is infinitely variable between zero and a maximum value to meet system demands, that is, a pump which operates at a predetermined minimum pressure as long as system demands do not exceed the capacity of the pump or pumps supplying the system and in which the pressure increases a slight amount as compared to the minimum pressure as the displacement of the pump begins to decrease in response to a decrease in system demands up to a predetermined maximum pressure as the displacement reaches zero in response to no system demands. The expression "variable pressure pumps" is intended to cover those pumps which, under normal operating conditions, operate at a pressure inversely proportional to demands.

SUMMARY OF THE INVENTION

An object of the present invention is to provide a multiple pump hydraulic system which includes both constant and variable pressure pumps, and which operates at substantially no flow when there are little or no system demands.

Another object of the present invention is to provide a multiple pump hydraulic system having both constant and variable pressure pumps and in which the variable pressure pump does not require large increments of power when the system demands are equal to or less than the capacity of a single constant pressure pump.

Still another object of the invention is to provide a multiple pump hydraulic system which is extremely stable and which during periods when the system demands can be satisfied by a single pump does not require appreciably larger increments of input power than required by a single pump system.

A further object of the present invention is to provide a simple, compact, and rugged pump control valve for a variable pressure pump which allows the fixed displacement pump to be integrated into a closed center hydraulic system.

Yet another object of the invention is to provide a closed center hydraulic system which includes a variable pressure pump and a novel control valve for the variable pressure pump which possesses a rapid response to system demands and a high degree of dynamic stability.

The above objects and additional objects and advantages of the invention will beocme apparent along with the details of construction of a preferred embodiment of the invention from a reading of the following detailed description when taken in conjunction with the accompanying drawings.

BRIEF DESCRIPTION OF THE DRAWINGS

In the drawings:
FIG. 3 is a sectional view of the control valve taken substantially along the lines 3—3 of FIG. 2;
and
FIG. 4 is a sectional view taken substantially along the lines 4—4 of FIG. 3.

DESCRIPTION OF THE PREFERRED EMBODIMENT

Figure 1:
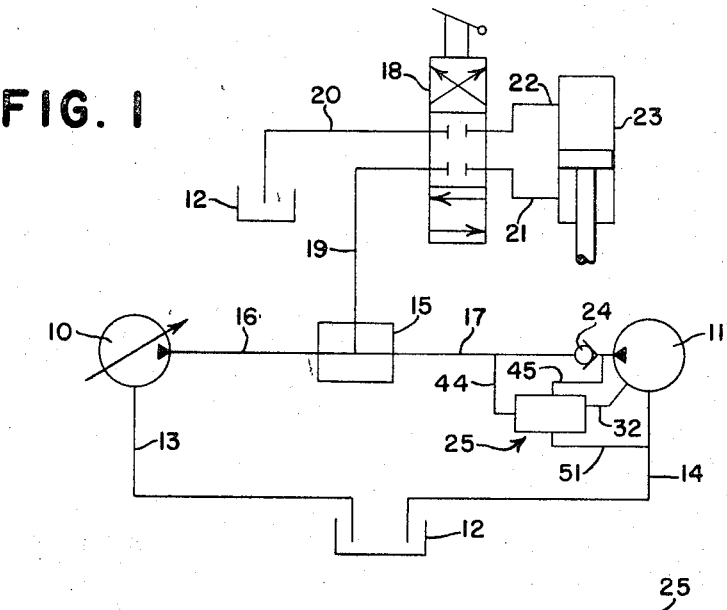
FIG. 1 is a schematic view of a multiple pump hydraulic system.

Referring to the drawings, the hydraulic system is schematically illustrated in FIG. 1, and includes a constant pressure variable displacement pump 10 and a variable pressure pump 11, the capacity of pump 11 being equal to or less than the capacity of pump 10. The pump 10 is a variable displacement substantially constant pressure pump and can be any well-known type of pump in which the volume output of the pump is infinitely variable between zero and a maximum value, for example, as illustrated in U.S. Pat. 3,002,462 issued to Thomas E. Raymond on Oct. 3, 1961. The pump 11 can be any form of variable pressure pump, but by way of illustration will be described as a multiple piston pump having a cylinder block carrying a plurality of pistons which project into a common drive chamber and a cam within the drive chamber engageable with the pistons to drive the pistons through pumping strokes upon relative rotation between the cylinder block and the cam.

The intake manifolds of the pumps 10 and 11 are connected to a fluid reservoir 12 by fluid lines 13 and 14 respectively, while the discharge manifolds of the pumps 10 and 11 are connected to a common manifold 15 by fluid lines 16 and 17 respectively. The manifold 15 and the fluid reservoir 12 are connected to a manual control valve 18 by fluid lines 19 and 20 respectively. Fluid lines 21 and 22 connect the manual control valve 18 to opposite ends of a hydraulic cylinder or function 23 so that through appropriate manipulation of the manual control valve 18 the ends of the hydraulic function 23 are connectible alternatively to a source of fluid pressure and a fluid reservoir. For reasons which will be more apparent hereinafter, back flow of fluid through the fluid line 17 is prevented by a check valve 24 which is interposed in the fluid line 17. The fluid system also includes a control valve indicated generally at 25 which controls the flow of fluid from the pump 11 in a manner to be explained hereinafter.

While the hydraulic system has been generally described with a single hydraulic function 23, it should be understood that a plurality of hydraulic functions and control valves can be connected in parallel so that the pumps 10 and 11 can supply fluid pressure to any selected one or a combination of hydraulic functions.

The control valve 25 includes a valve body 26 having an elongated valve bore 27. At its inner end the valve bore 27 is of reduced diameter to provide a small end section which forms a servo chamber 28, and intermediate its ends the valve bore 27 is provided with two annular grooves 29 and 30. Intermediate the annular grooves 29 and 30, the valve body is provided with a fluid passage 31 which connects the valve bore 27 with a fluid line 32. The fluid line 32 interconnects the fluid passage 31 with the drive chamber of the pump 11. A valve member 33 is slidably mounted in the valve bore 27 and is normally biased towards the servo chamber 28 by a spring 34. The bore 27 is closed by a plug 35 which is threaded into the valve body 26. The plug 35 is provided with a threaded bore 36 which receives an adjusting screw 37. The spring 34 acts between the valve member 33 and the adjusting screw 37 so that by threading the screw 37 further into the plug 35 the amount of force provided by the spring 34 against the valve member 33 can be increased. Nut 38 on the outer end of the screw 37 is used to lock the screw 37 in any adjusted position.

The valve member 33 is provided with a short longitudinally extending bore 39 which extends between the end of the valve member 33 which is adjacent the servo chamber 28 and a transversely extending through bore 40 provided in the valve member 33. A small piston 41 is slidably received in the bore 39 and abuts against an end of the servo chamber 28. The piston 41, bore 39, and bore 40 form a second servo chamber so that if fluid pressure is supplied to the transversely extending through bore 40 the fluid pressure will act against the piston 41 and the wall of the bore 40 to tend to displace the valve member 33 against the force of the spring 34. Fluid pressure is supplied to the transversely extending bore 40 through a fluid passage 42 which communicates with an annular groove 43 provided on the valve member 33. The groove 43 maintains the bore 40 in communication with the fluid passage 42 as the valve member 33 is shifted between extreme positions. A fluid line 44 interconnects the fluid passage 42 with the fluid line 17 so that the fluid pressure available to act against the piston 41 is at all times substantially equal to the fluid pressure available to meet the demands of the hydraulic function 23.

Fluid displaced from the pump 11 is also free to flow to the valve bore 27 by way of a fluid line 45 which extends between the discharge manifold of the pump 11 and a filter chamber 46 in the valve body 26. The filter chamber 46 contains a filter element 47, is closed at one end by a removable plug 48, and communicates with the annular groove 29 by way of a fluid passage 49. An additional fluid passage 50 extends from the valve bore 27 and allows fluid to flow from the valve bore 27 to the intake manifold of the pump 11 or to the fluid line 14 by way of an additional fluid line 51.

Figure 2:
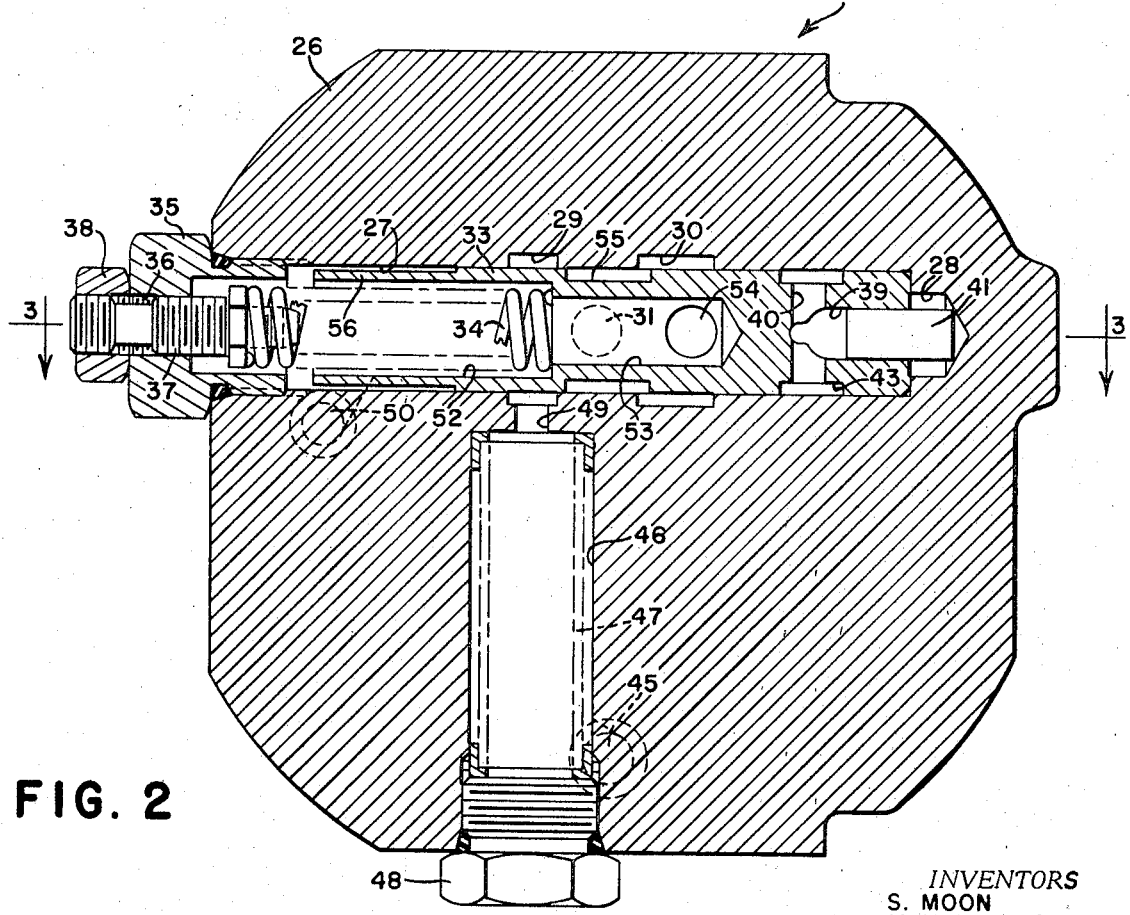
FIG. 2 is a sectional view of a control valve shown schematically in FIG. 1, taken substantially along the lines 2—2 of FIG. 3.

The valve member 33 includes additional longitudinally extending bores 52 and 53, an additional transversely extending through bore 54, an external annular groove 55 midway along its length, and an end portion 56 of reduced diameter which provides a clearance between the valve member and the bore which overlies the juncture between the valve bore 27 and the fluid passage 50. The annular grooves 55 and 30, bores 54, 53 and 52, and the valve to bore clearance provided by the end portion 56 of the valve member 33 allow fluid to flow from the drive chamber of the pump 11 through the fluid line 32, passage 31, valve member 33, fluid passage 50, fluid line 51, and into the intake manifold of the pump 11 whenever the valve member 33 is shifted to the right as viewed in FIGS. 2 and 3.

An additional bore 58 is provided in the valve body 26 and extends substantially parallel to the valve bore 27. The bore 58 is closed by a plug 59, and is placed in fluid communication with the valve bore 27 at spaced locations by the passage 60 and the orifice passages 61 and 62. The orifice passage 61 communicates with the valve bore 27 at a point underlying the annular groove 55 on the valve member 33, the orifice passage 62 communicates with the valve bore 27 at a point underlying the end portion 56 of the valve member 33, and the fluid passage 60 communicates with the servo chamber 28.

The operation of the above described control valve is as follows. The adjusting screw 37 is first set to compress the spring 34 a sufficient amount so that the fluid pressure acting against the piston 41 required to shift the valve member 33 against the biasing force of the spring 34 will be no greater than the maximum pressure which the constant pressure variable displacement pump can supply to the system. Then, assuming that the manual control valve 18 is in a neutral position so that there is no demand from the hydraulic function 23, as the pumps 10 and 11 are driven by an undisclosed prime mover, pressure in the system will increase and increase the pressure acting against the piston 41. When the pressure in the system has reached a pressure no greater than the maximum pressure which the variable displacement pump 10 is capable of supplying, the fluid pressure acting against the piston 41 and the wall of the bore 40 will move the valve member 33 to the left against the biasing force of the spring 34 to bring the annular groove 55 into communication with the annular groove 29. With the valve member 33 shifted to the left, fluid displaced from the pump 11 is free to flow through the fluid line 45, filter chamber 46, fluid passage 49, annular grooves 29 and 55, fluid passage 31, and fluid line 32 into the drive chamber of the pump 11. Since the fluid pressure required to circulate the fluid to the drive chamber of pump 11 is less than the pressure in fluid line 17, the check valve 24 isolates the variable displacement pump 10 from the pump 11 and the pump 11 from the system. The fluid pressure entering the drive chamber of the pump 11 will hold the pistons at one extreme end of their strokes and away from the drive cam to stop the displacement of fluid from the pump 11.

When fluid pressure is circulated to the drive chamber of the pump 11 a portion of fluid pressure is circulated back to the intake manifold of the pump 11 through orifice passage 61, bore 58, orifice passage 62, fluid passage 50 and fluid line 51. The orifice passage 62 has an area smaller than orifice passage 61 and also smaller than the area of the valve to bore clearance provided by the portion of reduced diameter 56 of the valve member 33 so that there is a controlled pressure in bore 58. The pressure in the bore 58 is routed to the end of the valve member 33 through fluid passage 60 and into the servo chamber 28. The fluid pressure in servo chamber 28 acts against the end of valve member 33 and provides an additional force to hold the valve member 33 against the biasing force of the spring 34.

As long as the demands of the hydraulic function 23 do not exceed the capacity of the variable displacement pump 10 so that the pump 10 can maintain a constant pressure in the system, the control valve 25 will remain in the condition previously described. However, when demands of the hydraulic function 23 exceed the capacity of the variable displacement pump 10, pressure in the hydraulic system will decrease and the fluid pressure within bores 39 and 40 will also decrease. When the fluid pressure within bores 39 and 40 has decreased a sufficient amount so that the sum of the forces provided by the fluid pressure within bores 39 and 40 acting between valve member 33 and piston 41 and the fluid pressure within servo chamber 28 acting on the end of the valve member 33 is less than the biasing force provided by the spring 34, the valve member 33 will be shifted to the right to the position illustrated in FIGS. 2 and 3, thus cutting off annular groove 29 from annular groove 55 and connecting annular groove 30 with annular groove 55. With the valve member 33 in the position just described, the fluid pressure in the drive chamber of the pump 11 will be exhausted through the fluid line 32, the fluid passage 31, annular grooves 55 and 30, bores 54, 53 and 52, the valve bore clearance at the end 56 of the valve member 33, fluid passage 50, and fluid line 51 to the fluid line 14. At the same time, fluid pressure in the servo chamber 28 is exhausted through the orifice passages 61 and 62. With the fluid pressure exhausted from the drive chamber of the pump 11, the pistons will again engage the cam so that fluid pressure will again be discharged from the pump 11 into the fluid line 17.

The control valve 25 will remain in the condition just described as long as the demands of the function 23 are not less than the capacity of the pump 11. For example, as long as the demands of the function 23 are equal to or greater than the capacity of the pump 11, the variable displacement pump 10 will meet the demands in excess of the capacity of the pump 11.

As soon as the demands of the function 23 are less than the capacity of the pump 11 the discharge pressure of pump 11 and the fluid pressure in the lines 16, 17, 19 and 44 increases until the fluid pressure acting against the piston 41 again shifts the valve member 33 to the left. This immediately stops discharge of fluid from pump 11 in the manner previously described, and the output of the pump 10 increases an amount sufficient to meet the demands of the hydraulic function.

From the above it can be seen that the multiple pump hydraulic system illustrated in FIG. 1 is extremely stable, wastes very little power, and provides rapid response to system demands.

What is claimed is:

1. A hydraulic system comprising: at least one hydraulic function; first and second pumps; the first pump having a variable displacement and operating at a substantially constant discharge pressure; fluid line means interconnecting the pumps and the function; check valve means interposed in the field line means preventing reverse flow through the fluid line means to the second pump; and means controlling fluid pressure in the fluid line means upstream of the check valve means including a valve member for exhausting fluid from the fluid line means upstream of the check valve means, means biasing the valve member to a fluid blocking position, first servo means in opposition to the biasing means responsive to fluid pressure downstream of the check valve means for moving the valve member to a fluid exhausting position when the fluid pressure downstream of the check valve means reaches a predetermined high pressure, and second servo means in opposition to the biasing means responsive to the pressure of fluid exhausted from the fluid line means to hold the valve member in its fluid exhausting position until the fluid pressure downstream of the check valve means reaches a predetermined low pressure below the predetermined high pressure.

2. The hydraulic system as set forth in claim 1 wherein the second pump is a reciprocating piston pump having a drive chamber and means within said chamber for drivingly engaging a plurality of pistons projecting into said chamber, the means controlling fluid pressure in the fluid line means upstream of the check valve means exhausts fluid from the line means upstream of the check valve means to the drive chamber of the second pump to hold said pistons away from said means for drivingly engaging said pistons when the pressure in said fluid line means reaches said predetermined high pressure.

3. A hydraulic system comprising: at least one hydraulic function; first and second pumps; the first pump having a variable displacement and operating at a substantially constant discharge pressure; the second pump having a plurality of reciprocating pistons projecting into a drive chamber and means within the chamber for drivingly engaging the pistons; fluid line means interconnecting the function and pumps; and means for routing fluid from the lie means to the drive chamber of the second pump to pressurize the chamber and hold the pistons away from the means for drivingly engaging the pistons including a valve member movable between fluid blocking and fluid passing positions, means biasing the valve member to the fluid blocking position, first servo means acting in opposition to the biasing means responsive to fluid pressure in the line means to move the valve member to the fluid passing position when fluid pressure in the fluid line means reaches a predetermined high pressure, and second servo means acting in opposition to the biasing means responsive to the pressure of fluid routed to the drive chamber to hold the valve member in the fluid passing position until fluid pressure in the fluid line means reaches a predetermined low pressure below the predetermined high pressure.

4. The hydraulic system set forth in claim 3 wherein the routing means further includes a valve body having a valve bore therein, first fluid conducting means establishing communiaction between the bore and drive chamber of the second pump, second fluid conducting means establishing communication betwen the bore and the fluid line means, and third fluid conducting means establishing communication between the bore and the intake side of the second pump, and the valve member is slidably mounted in the bore for movement between its fluid blocking position in which it blocks the entrance of the second fluid conducting means to the valve bore and its fluid passing position in which it restricts communication of the third fluid conducting means with the first and second fluid conducting mans.

5. The hydraulic system set forth in claim 4 wherein the second servo means is in fluid communication with the first fluid conducting means and a fourth fluid conducting means establishes communication between the fluid line means and first servo means.

6. The combination as set forth in claim 5 wherein said biasing means is adjustable to vary the force acting against said valve member whereby said predetermined high and low pressures can be varied.

7. A hydraulic system comprising: at least one hydraulic function; a pump; fluid line means interconnecting the function and pump; means between the function and pump for maitaining a predetermined minimum pressure in the fluid line means as long as the demands of the function do not exceed a predetermined valve; check valve means in the fluid line means between the pump and the means for maintaining a predetermined minimum pressure for isolating the pump from the remainder of tthe hydraulic system when the pressure in the fluid line means is greater than the discharge pressure of the pump; and control means to circulate fluid discharged from the pump back to the pump including a valve member movable between fluid blocking and fluid passing positions, means biasing the valve member to the fluid blocking position, first servo means in opposition to the biasing means responsive to fluid pressure downstream of the check valve means for moving the valve member to the fluid passing position when the fluid pressure downstream of the check valve means reaches a predetermined high pressure, and second servo means in opposition to the biasing means responsive to the pressure of fluid circulated back to the pump to hold the valve member in its fluid exhausting position until the fluid pressure downstream of the check valve means reaches a predetermined low pressure below the predetermined high pressure.

8. The hydraulic system as set forth in claim 7 wherein said pump is a reciprocating piston pump having a plurality of pistons reciprocally carried by a cylinder block and projecting into a common drive chamber and a drive means including a cam in said chamber for engaging said pistons to drive said pistons through pumping strokes upon relative rotation between said cylinder block and said cam, and wherein said control means circulates the fluid discharged from said pump to said drive chamber whereby fluid pressure in said drive chamber will hold said pistons at an extreme end of their stroke and away from said cam to stop the discharge of pressure from said pump.

9. The hydraulic system as set forth in claim 8 wherein said control means comprises: a valve body having a valve bore, first fluid passage means establishing fluid communication between said valve bore and said drive chamber, second fluid passage means establishing fluid communication between said valve bore and the discharge port of said pump, third fluid passage means establishing fluid communication between said valve bore and the intake side of said pump, and the valve member is slidably mounted in said bore for movement between its fluid blocking position in which it blocks the entrance of the second fluid passage means to the valve bore and its fluid passing position in which it restricts communication of the third fluid passage means with the first and second fluid passage means.

10. The hydraulic system set force in claim 9 wherein fourth fluid passage means establishes fluid communication between the first servo means and the fluid line means downstream of the check valve means, fluid conducting means establishes continual communication between the first fluid passage means, the second servo means and the third fluid passage means, and the fluid conducting means includes first and second restricted passage means which, when the valve member is in the fluid passing position, establish a pressure drop between the first fluid passage means and the second servo means and between the second servo means and the third fluid passage means.

References Cited
UNITED STATES PATENTS

| | | | |
|---|---|---|---|
| 2,238,063 | 4/1941 | Kendrick | 60—52 |
| 2,716,945 | 9/1955 | Presnell | 103—161 |
| 2,936,588 | 5/1960 | Van Gerpen | 60—52 |
| 3,002,462 | 10/1961 | Raymond | 103—174 |
| 3,093,081 | 6/1963 | Budzich | 103—11 |
| 3,440,965 | 4/1969 | Raymond | 103—37 |

WILLIAM L. FREEH, Primary Examiner

U.S. Cl. X.R.

417—216, 287

UNITED STATES PATENT OFFICE
CERTIFICATE OF CORRECTION

Patent No. 3,526,468          Dated 1 September 1970

Inventor(s) Seaton Moon, Matthew Rudolph Olsofski, James Melvin Bahl, and Arvid Gayle Waschek It is certified that error appears in the above-identified patent and that said Letters Patent are hereby corrected as shown below:

Column 5, line 70, change "field" to -- fluid --.
Column 6, line 32, change "lie" to -- line --; line 51, change "communiaction" to -- communication --; line 75, change "maitaining" to -- maintaining --.
Column 7, line 6, change "tthe" to --the--.

SIGNED AND SEALED
DEC 22 1970

(SEAL)
Attest:

Edward M. Fletcher, Jr.
Attesting Officer

WILLIAM E. SCHUYLER, JR.
Commissioner of Patents